United States Patent
Bendejacq et al.

(10) Patent No.: US 7,884,056 B2
(45) Date of Patent: Feb. 8, 2011

(54) COMPOSITION THAT CAN FORM A GEL COMPRISING A COPOLYMER, AND USEFUL COPOLYMERS

(75) Inventors: Denis Bendejacq, Paris (FR); Claire Pitois, Henrik (SE); Katerina Karagianni, Paris (FR)

(73) Assignee: Rhodia Chimie, Aubervilliers (FR)

( * ) Notice: Subject to any disclaimer, the term of this patent is extended or adjusted under 35 U.S.C. 154(b) by 353 days.

(21) Appl. No.: 11/793,490

(22) PCT Filed: Dec. 20, 2005

(86) PCT No.: PCT/FR2005/003195

§ 371 (c)(1),
(2), (4) Date: Aug. 20, 2008

(87) PCT Pub. No.: WO2006/067325

PCT Pub. Date: Jun. 29, 2006

(65) Prior Publication Data

US 2010/0120637 A1    May 13, 2010

(30) Foreign Application Priority Data

Dec. 21, 2004 (FR) .................... 04 13657

(51) Int. Cl.
C09K 8/588 (2006.01)
C08F 293/00 (2006.01)
C08F 287/00 (2006.01)
E21B 43/00 (2006.01)

(52) U.S. Cl. .......... 507/219; 507/221; 507/222; 507/224; 507/225; 507/230; 525/261; 525/299; 525/301; 525/302; 525/303; 525/309; 528/271; 528/363; 528/364; 528/369; 528/370; 528/374; 528/376; 528/422

(58) Field of Classification Search .......... 507/219, 507/221, 222, 224, 225, 230; 525/261, 299, 525/301, 302, 303, 309; 528/271, 363, 364, 528/369, 370, 374, 376, 422

See application file for complete search history.

(56) References Cited

U.S. PATENT DOCUMENTS 6,201,099 B1 * 3/2001 Petersen et al. ............ 528/376
6,904,972 B2 * 6/2005 Zhang et al. ............ 166/308.1

FOREIGN PATENT DOCUMENTS

WO    WO 0183946 A1 * 11/2001

OTHER PUBLICATIONS

Shemper et al., Synthesis and characterization of statistical and block fluorinated copolymers with linear and star-like architectures via ATRP, European Polymer Journal, 40, 2004, 651-665.*

* cited by examiner

*Primary Examiner*—Timothy J. Kugel
(74) *Attorney, Agent, or Firm*—Buchanan Ingersoll & Rooney PC

(57) ABSTRACT

The invention relates to a composition that can form a gel comprising a copolymer. Said composition is an aqueous composition, and the copolymer is a star copolymer. The invention also relates to useful copolymers, especially for the inventive compositions.

24 Claims, No Drawings

COMPOSITION THAT CAN FORM A GEL COMPRISING A COPOLYMER, AND USEFUL COPOLYMERS

CROSS REFERENCE TO PRIORITY APPLICATIONS

This application is the United States national phase of International Application No. PCT/FR2005/003195, filed Dec. 20, 2005, published in French as International Publication No. WO 2006/067325 A1 on Jun. 29, 2006, and claims priority of French Application No. 0413657, filed Dec. 21, 2004, each hereby expressly incorporated by reference in its entirety and each assigned to the assignee hereof.

One subject of the present invention is a composition that can form a gel comprising a copolymer. The composition is an aqueous composition, and the copolymer is a star copolymer. Another subject of the present invention is useful copolymers, especially for these compositions.

Compositions in the form of gels are used in various industries, for example in the industry for exploiting gas and oil deposits, the cosmetics industry, the home care product industry, and the coating, especially paint, industry.

In the aqueous formulations, it is known to use amphiphilic polymers known as associative polymers, in order to obtain gels. It is also known to use certain surfactants, known as viscoelastic surfactants. It is also known to use combinations of polyionic polymers and oppositely-charged compounds. Physical interactions are thus created in water that result in the formation of gels. It is also known to use systems having chemical crosslinking for example, combinations of guar or guar derivatives with compounds comprising boron, for example borax. All these technologies make it possible to obtain gels having different properties, for example in terms of reversibility, in terms of behaviour at various temperature, pressure and pH conditions, in terms of rheological properties at various shear rates, especially the strength of the gel, and/or amount of products to be used.

Document WO 01/16187 describes the formation of gels using amphiphilic diblock copolymers comprising a hydrophilic block and a hydrophobic block, and of which the hydrophilic block comprises hydrophobic units.

Document WO 03/006532 describes the formation of a gel using a combination of a cationic bridging polymer and a star copolymer (microgel) comprising a core and, at the periphery of the core, macromolecular branches that each comprise a polyacrylamide or polyhydroxyethylacrylate neutral intermediate hydrophilic block and a polyacrylic acid hydrophilic peripheral block, which is anionic at pH 7.

Furthermore, document WO 00/02939 describes a process for preparing star copolymers (or microgels) and the star copolymers obtained. This document teaches in a very general manner, page 18, lines 5 to 7, that the star copolymers can be used as rheology control agents in aqueous compositions. However this document does not disclose the formation of gels, and does not identify the copolymers or families of copolymers which may find a use as rheology control agents. The copolymers described in the examples comprise a polymeric organic core and branches made from hydrophobic homopolymers (styrene) or hydrophobic random copolymers (isobutyl methacrylate/ethylhexyl methacrylate). The examples do not disclose branches in the form of block copolymers.

Document WO 01/77198 describes another process for preparing star copolymers (or microgels) and the star copolymers obtained. This document teaches that the shape and morphology of the products may be very diverse (page 22). This document very generally teaches, page 24, line 15, that the star copolymers may be used as rheology control agents compositions. The compositions described in the document are generally nonaqueous compositions. The copolymers described in the examples comprise a polymeric organic core (generally hydrophobic based on butyl methacrylate) and branches of diblock copolymers comprising an intermediate hydrophobic block (based on butyl methacrylate) and a hydrophilic peripheral block (based on methacrylic acid). These copolymers do not allow gels to be obtained in an aqueous medium.

Document WO 2004/014535 describes a process for preparing star copolymers (or microgels) and the star copolymers obtained. The copolymers comprise a polymeric organic core and polymeric branches which may, if necessary, comprise combinations of various monomers to modulate some properties. Combinations of monomers are described on page 21, lines 16-27. The document does not describe particular arrangements for these combinations. The copolymers described in the examples comprise a polymeric organic core (based on acrylamide) and branches of acrylamide homopolymers, or a polymeric organic core (based on butyl acrylate) and branches of butyl acrylate homopolymers.

Novel systems are still sought which may form gels, which may have different properties, for example in terms of reversibility, in terms of behaviour at various temperature, pressure and pH conditions, in terms of rheological properties at different shear rates, especially the strength of the gel, and/or in terms of amount of products to be used. These novel gels may thus make it possible to modulate the properties of formulations in various fields of industry and/or to facilitate their preparation or use. To this effect, novel chemical compounds are also still sought which may provide these improvements.

Thus, the invention provides a star copolymer comprising a core and, at the periphery of the core, macromolecular branches each comprising:

an intermediate block A linked to the core or at least partly included in the core; and a peripheral block B linked to the block A;

the blocks A and B being such that:

block A is hydrophilic and block B is hydrophobic; or block A is hydrophilic and block B is hydrophilic, cationic or potentially cationic.

The novel star copolymers may be used in aqueous compositions, especially to form gels, or may be used in another way.

Thus the invention also provides an aqueous composition comprising:

water;

the copolymer; and optionally at least one surfactant.

The invention also provides a method for controlling the formation of viscoelastic gels comprising the following steps:

a) preparing an aqueous composition comprising:

water;

the copolymer; and optionally a surfactant; and b) forming a gel by stirring and/or by addition of surfactant and/or heating.

The invention also provides fluids for the exploitation of oil or gas deposits, advantageously fracturing fluids, comprising the copolymer, water and optionally a surfactant, or the use of the copolymer and optionally a surfactant in the fluids, preferably in the fracturing fluids, or the use of the method above during the exploitation of oil or gas deposits.

DEFINITIONS

In the present application, the term "star copolymer" is understood to mean an at least partially macromolecular compound comprising a core and, at the periphery of the core, macromolecular branches, linked to the core. These are architectures that are more or less complex, which are known to a person skilled in the art. The term "microgel" is also sometimes used which includes star copolymers and copolymers of other architectures. In the present application the term star copolymer covers the microgel concept. In the present application, the term "arms" is also used instead of "branches" and covers the same idea. The number of branches is by definition at least 3. This number is generally linked to the nature of the core and/or to the process of preparing the copolymer.

In the present application, the expression "unit deriving from a monomer" denotes a unit which may be obtained directly from said monomer by polymerization. Thus, for example, a unit deriving from an acrylic or methacrylic acid ester does not cover a unit of formula —$CH_2$—CH(COOH)—, —$CH_2$C($CH_3$)(COOH)—, —$CH_2$—CH(OH)—, respectively, obtained for example by polymerizing an acrylic or methacrylic acid ester, or a vinyl acetate ester, respectively, then by hydrolyzing it. A unit deriving from acrylic or methacrylic acid covers, for example, a unit obtained by polymerizing a monomer (for example an acrylic or methacrylic acid ester), then by making the polymer obtained react (for example by hydrolysis) so as to obtain units of formula —$CH_2$—CH(COOH)—, or —$CH_2$—C($CH_3$)(COOH)—. A unit deriving from a vinyl alcohol covers, for example, a unit obtained by polymerizing a monomer (for example a vinyl ester), then by making the polymer obtained react (for example by hydrolysis) so as to obtain units of formula —$CH_2$—CH(OH)—.

Typically, the theoretical average molecular weight $M_{block}$ of a block, is calculated according to the following formula:

$$M_{block} = \sum_i M_i * \frac{n_i}{n_{precursor}},$$

where $M_i$ is the molecular weight of a monomer i, $n_i$ is the number of moles of the monomer i, $n_{precursor}$ is the number of moles of functional groups to which the macromolecular chain of the block will be linked. The functional groups may come from a transfer agent (or a transfer group) or an initiator, a previous block, a core, etc. If this is a previous block or a core, the number of moles may be considered as the number of moles of a compound to which the macromolecular chain of said previous block or core has been linked, for example a transfer agent (or a transfer group) or an initiator.

The measured molecular weights of branches are number-average molecular weights, measured by size exclusion chromatography (SEC), before assembling the branches to a core, or before formation of a core.

The measured molecular weights of a block are number-average molecular weights, measured by size exclusion chromatography (SC), after formation of the block, from which the measured molecular weight of a previously formed block is optionally subtracted.

The coefficient for theoretical branch generation is given by the formula $r=n_{Rdifunct}/n_{precursor}$, where $n_{difunct}$ is the number of moles of a diethylenically unsaturated crosslinking monomer $R_{difunct}$. The higher this coefficient is, in the case of C-branch microgels, the greater the number of branches. It is mentioned that the number of actual branches of the microgel is generally not equal to this coefficient. It is mentioned that this coefficient is generally adjusted as a function of the process for preparing the star copolymer: for an identical number of actual or measured branches, this is generally for a "core first" type method than for an "arm first" type method.

The measured molecular weight of a star copolymer $M_{star}$ is a weight-average molecular weight measured by static light scattering experiments, using Zimm plots.

The measured number of branches $n_{arm}$ for a copolymer having a crosslinked polymeric organic core is given by the formula: $M_{star}=M_w \times n_{arm}$ where $M_w$ is the weight-average molecular weight measured by the static light scattering experiments, using Zimm plots, on a block copolymer obtained in the same way as the star copolymer, but without use of a multiethylenically unsaturated monomer crosslinking monomer R).

In the present application, the term "hydrophobic" is used in its normal meaning of "having no affinity for water"; which means that the organic polymer of which it is composed, taken alone (having the same composition and the same molecular weight) would form a macroscopic two-phase solution in distilled water at 25° C., at a concentration greater than 1% by weight.

In the present application, the term "hydrophilic" is also used in its normal meaning of "having an affinity for water", that is to say is not capable of forming a macroscopic two-phase solution in distilled water at 25° C. at a concentration greater than 1% by weight.

In the present application, the term "viscoelastic gel" denotes a fluid that has a storage modulus G' greater than or equal to the loss modulus G" over a frequency range between 1 and 10 Hz, with a cone-plate type geometry, the moduli being measured in the linear viscoelastic region, at 25° C., with a Carrimed Rheometer. The rheological properties of the fluids may depend on the temperature. By extension, in the present application, the term "viscoelastic gel" denotes a fluid that has the property described above at at least a temperature between 25° C. and 300° C., at atmospheric pressure or at higher pressure.

The expression "cationic or potentially cationic units" is understood to mean units that comprise a cationic or potentially cationic group. The cationic units or groups are units or groups that have at least one positive charge (generally combined with one or more anions such as the chloride ion, bromide ion, a sulfate group or a methyl sulfate group), regardless of the pH of the medium into which the copolymer is introduced. The potentially cationic units or groups are units or groups which may be neutral or have at least one positive charge depending on the pH of the medium into which the copolymer is introduced. In this case they are referred to as potentially cationic units in neutral, form or in cationic form. By extension, it is possible to refer to cationic or potentially cationic monomers.

The expression "anionic or potentially anionic units" is understood to mean units that comprise an anionic or potentially anionic group. The anionic units or groups are units or groups that have at least one negative charge (generally combined with one or more cations such as cations of alkali metal or alkaline-earth metal compounds, for example sodium, or with one or more cationic compounds such as ammonium), regardless of the pH of the medium in which the copolymer is present. The potentially anionic units or groups are units or groups that may be neutral or have at least one negative charge depending on the pH of the medium in which the copolymer is present. In this case they are known as potentially anionic units in neutral form or in anionic form. By extension, it is possible to refer to anionic or potentially anionic monomers.

The term "neutral units" is understood to mean units that do not have any charge, regardless of the pH of the medium in which the copolymer is present.

Given below are some details as regards the copolymers of the invention, some of their features and processes used for their preparation, then as regards the surfactants which may be incorporated into the composition of the invention, then as regards the compositions themselves, and the uses.

Star Copolymer

Given below are details as regards the star copolymers according to the invention, and as regards the processes useful for their preparation. It is noted that these copolymers are novel and are especially advantageous for or in the compositions according to the present invention, especially to form gels. However it is specified that they, may be advantageous, in themselves, for example in other compositions and/or in other fields, for example for the treatment and/or modification of surfaces.

For example, mention is made of the cosmetic fields, the surface being a keratinous surface, for example the hair and eyelashes, or a cutaneous surface, the composition possibly being a shampoo, conditioner, shower gel, a product for protection from the sun, a skincare cream, the composition comprising, besides the copolymer, a cosmetically acceptable vector such as water, optionally anionic, nonionic, cationic amphoteric and/or zwitterionic surfactants, optionally conditioning agents, and optionally other ingredients normally used.

Mention is also made of the fields of household laundry care, in particular washing and of industrial or institutional cleaning of laundry, the surface being a textile surface, the composition possibly being a washing liquid for a washing machine, comprising, besides the copolymer, a vector such as water, optionally anionic, nonionic, cationic, amphoteric and/or zwitterionic surfactants, and optionally other ingredients normally used.

Mention is also made of the field of surface coatings, for example paints.

Most particularly, mention is made of the field for the exploitation of oil or gas deposits, the surface being the surface of a well, for example for reduction of filtrates.

The star copolymer comprises a core and, at the periphery of the core, macromolecular branches each comprising:
  an intermediate block A linked to the core or at least partly included in the core; and
  a peripheral block B linked to the block A;
  the blocks A and B being such that:
    block A is hydrophilic and block B is hydrophobic; or
    block A is hydrophilic and block B is hydrophilic, cationic or potentially cationic.

The macromolecular branches at the periphery of the core may be linked to the core, by block A, preferably by covalent bonds. The covalent bonds are preferably bonds between one end of block A and the periphery of the core. The macromolecular branches at the periphery of the core may form, through at least one part of block A, at least part of the core. The block A is in this case at least partly included in the core. Thus according to one embodiment, block A comprises units crosslinked together in the core. Block A is then at least partly included in the core. According to another embodiment, the core is a part A', for example a block A', comprising units crosslinked together, and of which the ends are linked to the A blocks.

The core may especially be:
  a mineral core;
  a nonpolymeric organic core;
  a chemically-crosslinked polymeric organic core; or
  a physically-crosslinked gelled polymeric organic core.

The copolymers having a mineral core have a block A linked to the core. The copolymers having a mineral core may especially be obtained by growth of the macromolecular branches onto chemical functional groups present at the surface of mineral, preferably nanoscale, particles, said surface having, where necessary, been especially functionalized for this purpose. The growth may be carried out, for example, via a controlled or living radical polymerization process. Such processes will be described hereinafter. Thus, it can be carried out by growth of the block A, then of the block B. Such copolymers may have a transfer group or a transfer group residue at the end of block B.

The copolymers having a mineral core may also be obtained by grafting of macromolecular branches prepared previously, between one end of block A and the surface of mineral particles. The end of block A and/or the mineral particles may be especially functionalized for this purpose.

The mineral core and/or the mineral particles may especially be nanoparticles. The mineral core and/or the mineral particles may especially be based on silica, titanium dioxide or cerium oxide.

The copolymers having a nonpolymeric organic core have a block A linked to the core. The copolymers having a nonpolymeric organic core may be obtained by growth of the macromolecular branches onto the chemical functional groups present on a molecule having at least three chemical functional groups capable of reacting for this growth. It may for example be a telechelic hyperbranched molecule or a dendrimer, preferably of low molecular weight. Such molecules are known to a person skilled in the art and such processes are known to a person skilled in the art. For example, reference may be made to the document WO 2004/078793. The growth may be achieved, for example, via a controlled or living polymerization process, using a transfer group or agent, for example via a controlled or living radical polymerization process. Such processes will be described hereinafter. Thus, it can be carried out by growth of the block A, then of the block B. Such copolymers may have a transfer group or a transfer group residue at the end of the block B.

The copolymers having a chemically-crosslinked polymeric organic core have a block A linked to the core, or preferably a block A partly included in the core. The copolymers having a chemically-crosslinked polymeric organic core by preparation methods known to a person skilled in the art, such as the method known as "core first", the methods known as "arm first" and the methods for chemically crosslinking micelles. These methods are known to a person skilled in the art and will be explained in detail below ("useful processes"). These processes may use controlled or living polymerization processes, with the aid of a transfer group or agent, for example by a controlled or living radical polymerization process.

According to one embodiment, the block A comprises units crosslinked together in the core. Block A is then at least partly included in the core. According to another embodiment, the core is a part A', for example a block A', comprising units crosslinked together, and of which the ends are linked to the A blocks. These embodiments can be attained both by the "core first" method and by the "arm first" method and by the methods for crosslinking micelles. Copolymers obtained by a core-first method may have a transfer group or a residue of a transfer group at the end of block B. Copolymers obtained by an arm-first method may have a transfer group or a residue of a transfer group in the core.

The copolymers having a physically-crosslinked gelled polymeric organic core have a block A linked to the core, or preferably a block A partly included in the core. According to one embodiment, the core is a block A', strongly hydrophobic, having a high glass transition temperature, preferably above 40° C., and of which the ends are linked to the A blocks. According to another embodiment, the block A is at least partly included in the core and is strongly hydrophobic, with a high glass transition temperature, preferably above 40° C. In the presence of water, the A and/or A' blocks come together to form gelled nodules, the core, which are difficult to detach, thus forming a physical crosslinking. Such phenomena and methods are known to a person skilled in the art. The macromolecular branches are thus generally block copolymers comprising the A block, the B block and optionally an A' block. Such block copolymers may, for example, be obtained using controlled or living polymerization processes, with the aid of a transfer group or agent, for example via a controlled or living radical polymerization process.

Whatever the nature of the core, the macromolecular branches each comprise a block A and a block B. Thus the macromolecular branches may have a diblock structure (block A)-(block B), or triblock structure (block A')-(block-A)-(block B). According to one preferred embodiment, at least the A or B blocks derive from α-ethylenically unsaturated monomers, preferably both the A and B blocks, and optionally the A' block if it is present. These structures, as has been mentioned above, may for example be obtained using controlled or living polymerization processes, with the aid of a transfer group or agent, for example via a controlled or living radical polymerization process.

According to a first embodiment of the branches, the block A is hydrophilic and the block B is hydrophobic. Thus the block A may comprise units deriving from hydrophilic monomers A, and the block B may comprise hydrophobic units $B_{phobic}$ deriving from hydrophobic monomers $B_{phobic}$. It is noted in this embodiment that the block A may be:

neutral, comprising neutral units $A_N$ deriving from neutral monomers $A_N$;

anionic or potentially anionic, comprising anionic or potentially anionic units $A_A$ deriving from anionic or potentially anionic monomers $A_A$; or cationic or potentially cationic, comprising cationic or potentially cationic units $A_C$ deriving from cationic or potentially cationic monomers $A_C$.

According to a second embodiment, the block A is hydrophilic and the block B is hydrophilic, cationic or potentially cationic. Thus, the block A may derive from hydrophilic monomers $A_{philic}$, and the block B may comprise units $B_C$ deriving from cationic or potentially cationic monomers $B_C$. It is noted in this embodiment that the block A is preferably neutral, comprising neutral units $A_N$ deriving from neutral monomers $A_N$.

It is noted that:

a hydrophilic, cationic or potentially cationic block B may comprise $A_N$ or $A_A$ or $B_{phobic}$ units in an amount of less than 25 mol %, preferably less than 10 mol %;

a hydrophobic block B may comprise $A_N$, $A_A$ or $B_C$ units in an amount of less than 25 mol %, preferably less than 10 mol %; and a block A may comprise $B_{phobic}$ units in an amount less than 40 mol %, preferably less than 25 mol %, preferably less than 10 mol %.

As examples of hydrophobic monomers $B_{phobic}$ from which the $B_{phobic}$ units of the hydrophobic block B may derive, mention may be made of:

vinyl aromatic monomers such as styrene, α-methylstyrene, vinyl toluene, etc.;

vinyl or vinylidene halides, such as vinyl chloride, or vinylidene chloride;

$C_1$-$C_{12}$ alkyl esters of α,β-mononethylenically unsaturated acids such as methyl, ethyl or butyl acrylates and methacrylates, 2-ethylhexyl acrylate, etc.;

vinyl or allyl esters of saturated carboxylic acids such as vinyl or allyl acetates, propionates, versatates, stearates, etc.;

α,β-mononethylenically unsaturated nitriles containing from 3 to 12 carbon atoms, such as acrylonitrile, methacrylonitrile, etc.;

α-olefins such as ethylene, etc.;

conjugated dienes, such as butadiene, isoprene, or chloroprene;

monomers capable of generating polydimethylsiloxane (PDMS) chains, thus the part B may be a silicone, for example a polydimethylsiloxane chain or a copolymer comprising dimethylsiloxy units, and diethylene glycol ethyl ether acrylate or diethylene glycol ethyl ether methacrylate.

As examples of neutral hydrophilic monomers $A_N$ from which the $A_N$ units of the hydrophilic block A may derive, mention may be made of:

hydroxyalkyl esters of α,β-ethylenically unsaturated acids such as hydroxyethyl or hydroxypropyl acrylates and methacrylates, glycerol monomethacrylate, etc.;

α,β-ethylenically unsaturated amides such as acrylamide, methacrylamide, N,N-dimethyl-methacrylamide, N-methylolacrylamide, etc.;

α,β-ethylenically unsaturated monomers bearing a water-soluble polyoxyalkylenated segment of the polyethylene oxide type, such as polyethylene oxide α-methacrylates (BISOMER S20W, S10W, etc. from Laporte) or α,ω-dimethacrylates, SIPOMER BEM from Rhodia (ω-behenyl polyoxyethylene methacrylate), SIPOMER SEM-25 from Rhodia (ω-tristyrylphenyl polyoxyethylene methacrylate), etc.;

the α,β-ethylenically unsaturated monomers that are precursors of hydrophilic units or segments such as vinyl acetate which, once polymerized, may be hydrolyzed to generate vinyl alcohol units or polyvinyl alcohol segments;

vinylpyrrolidones;

α,β-ethylenically unsaturated monomers of ureido type and in particular methacrylamido ethyl 2-imidazolidinone (SIPOMER WAM II from Rhodia); and nonethylene glycol methyl ether acrylate or nonethylene glycol methyl ether methacrylate.

As examples of potentially cationic monomers. $B_C$ from which the $B_C$ units of the potentially cationic block B may be derived, or as potentially cationic hydrophilic monomers $A_C$ from which the $A_C$ units of the block A may be derived, mention may be made of:

ω-(N,N-dialkylamino)alkyl amides of α,β-monoethylenically unsaturated carboxylic acids, such as N,N-dimethylaminomethylacrylamide or -methacrylamide, 2-(N,N-dimethylamino)ethyl acrylamide or -methacrylamide, 3-(N,N-dimethyl-amino)propylacrylamide or -methacrylamide, 4-(N,N-dimethylamino)butylacrylamide or -methacrylamide;

α,β-mononethylenically unsaturated amino esters such as 2-(dimethylamino)ethyl acrylate (ADAM), 2-(dimethylamino)ethyl methacrylate (DMAM), 3-(dimethylamino)propyl methacrylate, 2-(tert-butylamino)ethyl methacrylate, 2-(dipentylamino)ethyl methacrylate, or 2-(diethylamino)ethyl methacrylate;

vinyl pyridines;

vinyl amine;

vinylimidazolines; and monomers that are precursors of amine functional groups such as N-vinylformamide, N-vinylacetamide, etc. which generate primary amine functional groups by simple acidic or basic hydrolysis.

As examples of cationic monomers $B_C$ from which the $B_C$ units of the cationic block B may be derived, or as cationic hydrophilic monomers $A_C$ from which the $A_C$ units of the block A may be derived, mention may be made of:

ammonium acryloyl or acryloyloxy monomers such as:
trimethylammonium propylmethacrylate chloride;
trimethylammonium ethylacrylamide chloride or bromide or trimethylammonium methacrylamide chloride or bromide;
trimethylammonium butylacrylamide methyl sulfate or trimethylammonium methacrylamide methyl sulfate;
trimethylammonium propylmethacrylamide methyl sulfate (MES);
(3-methacrylamidopropyl)trimethylammonium chloride (MAPTAC);
3-acrylamidopropyl)trimethylammonium chloride (APTAC);
(methacryloyloxyethyl)trimethylammonium chloride or methyl sulfate;
(acryloyloxyethyl)trimethylammonium chloride or (acryloyloxyethyl)trimethylammonium methyl sulfate (ADAMQUAT C1 or ADAMQUAT MeS);
1-ethyl-2-vinylpyridinium or 1-ethyl-4-vinylpyridinium bromide, chloride or methyl sulfate;
N,N-dialkyldiallylamine monomers, such as N,N-dimethyldiallyl ammonium chloride (DADMAC); and
polyquaternary monomers such as dimethylamino-propylmethacrylamide N-(3-chloro-2-hydroxypropyl)trimethylammonium chloride (DIQUAT), etc.

As examples of anionic or potentially anionic monomers, from which anionic or potentially anionic units $A_A$ may be derived, mention may be made of:

monomers having at least one carboxyl functional group, such as α,β-ethylenically unsaturated carboxylic acids or the corresponding anhydrides, such as acrylic acid, methacrylic acid, maleic acid, acrylic anhydride, methacrylic anhydride, maleic anhydride, fumaric acid, itaconic acid, N-methacryloylalanine, N-acryloylglycine and their water-soluble salts;

monomers that are precursors of carboxylate functional groups, such as tert-butyl acrylate, which generate, after polymerization, carboxyl functional groups by hydrolysis;

monomers having at least one sulfate or sulfonate functional group, such as 2-sulfooxyethyl methacrylate, vinylbenzene sulfonic acid, allylsulfonic acid, 2-acrylamido-2-methylpropanesulfonic acid, sulfoethyl acrylate or methacrylate, sulfopropyl acrylate or methacrylate and their water-soluble salts; and monomers having at least one phosphonate or phosphate functional group, such as vinylphosphonic acid, etc., ethylenically unsaturated esters of phosphates, such as the phosphates derived from hydroxyethyl methacrylate (EMPICRYL 6835 from Rhodia) and those derived from polyoxyalkylene methacrylates and their water-soluble salts.

For example, the star copolymer may comprise the following combinations:

"PAA" block A deriving from acrylic acid ($A_A$ units) and "PBuA" block B deriving from butyl acrylate ($B_{phobic}$ units);

"PAM" block A deriving from acrylamide ($A_N$ units) and "PBuA" block B deriving from butyl acrylate ($B_{phobic}$ units);

"PAM" block A deriving from acrylamide ($A_N$ units) and "PDEGA" block B deriving from DEGA ($B_{phobic}$ units); and "PAM" block A deriving from acrylamide ($A_N$ units) and "P ADAMQUAT" block B deriving from ADAMQUAT ($B_C$ units, ADAMQUAT C1 or ADAMQUAT MeS).

Other Features of the Copolymer

The copolymer according to the invention may especially be present in the form of a powder, in the form of a dispersion in a liquid or in the form of a solution in a solvent (water or other solvent). The form generally depends on the demands linked to the use of the copolymer. It may also be linked to the method for preparing the copolymer.

The copolymer preferably comprises at least 10 branches, and generally at most around 250 branches. The number of branches may be controlled, by choice of the preparation method, and of the type of core used. This is known to a person skilled in the art. According to one particular embodiment, the core is a chemically-crosslinked organic polymeric core, obtained by controlled radical polymerization using a "precursor" control or transfer agent, in the presence of a source of free radicals, and of a crosslinking monomer R that is diethylenically unsaturated $R_{difunct}$, the coefficient for theoretical branch generation being greater than or equal to 0.25. Thus, the core advantageously comprises C core units which may derive from a C core monomer, and crosslinking units R which may derive from a crosslinking monomer R. Of course, it is not excluded that the C units and the C monomers comprise several different units or derive from several different monomers.

The branches may have a molecular weight (theoretical or measured) between 1000 g/mol and 100 000 g/mol. It is preferably between 10 000 g/mol and 30 000 g/mol. In these branches, the blocks may have a molecular weight between 1000 g/mol and 99 000 g/mol, preferably between 2000 g/mol and 28 000 g/mol.

Within the context of the embodiment where the block A is a hydrophilic block and the block B is a hydrophobic block, the weight ratio between the block A and the block B (A/B) is preferably greater than or equal to 40/60, preferably greater than or equal to 50/50, preferably greater than or equal to 65/35. The block A may, for example, have a molecular weight between 5000 and 20 000 g/mol, and the block B may, for example, have a molecular weight between 2000 and 10 000 g/mol, the ratio preferably being such as mentioned above. It is advantageously a copolymer whose core is a chemically-crosslinked polymeric organic core.

Within the context of the embodiment where the block A is a hydrophilic block and the block B is a cationic or potentially cationic block, the weight ratio between the block A and the block B (A/B) is preferably greater than or equal to 40/60, preferably greater than or equal to 50/50, preferably greater than or equal to 65/35. The block A may, for example, have a molecular weight between 5000 and 70 000 g/mol, for example between 20 000 and 50 000, and the block B may, for example, have a molecular weight between 1000 and 20 000 g/mol, for example between 2000 and 10 000, the ratio preferably being such as mentioned above. It is advantageously a copolymer whose core is a chemically-crosslinked polymeric organic core.

Processes Useful for the Preparation of the Star Copolymer

All the processes that make it possible to prepare star copolymers as described above may be used.

Particularly advantageous processes use a controlled or living polymerization, with the aid of a transfer group or agent, for example via a controlled or living radical polymerization process. This polymerization especially makes it possible to prepare cores, macromolecular branches; blocks, or block copolymers, especially by growth of said cores, macromolecular branches, blocks, or block copolymers. Numerous processes for controlled or living radical polymerization and/or numerous transfer groups or agents have been described. They are known to a person skilled in the art. It is mentioned that it is not excluded to use other methods, especially ring-opening (in particular anionic or cationic) polymerizations, anionic or cationic polymerizations, or grafting methods.

As examples of polymerization processes known as living or controlled, reference may especially be made to:
- the processes from applications WO 98/58974, WO 00/75207 and WO 01/42312 which carry out a controlled radical polymerization using xanthate type control agents;
- the controlled radical polymerization process using dithioester type control agents from application WO 98/01478;
- the process described in the application WO 02/08307, especially, for producing copolymers comprising polyorganosiloxane blocks;
- the controlled radical polymerization process using dithiocarbamate type control agents from application WO 99/31144;
- the controlled radical polymerization process using dithiocarbazate type control agents from application WO 02/26836;
- the controlled radical polymerization process using dithiophosphoroester type control agents from application WO 02/10223, (optionally the block copolymers obtained as above by controlled radical polymerization may undergo a reaction for purifying their sulfur-containing chain end, for example by hydrolysis, oxidation, reduction, pyrolysis or substitution type processes),
- the process from application WO 99/03894 which carries out a polymerization in the presence of nitroxide precursor;
- the process from application WO 96/30421 which uses an atom transfer radical polymerization (ATRP);
- the controlled radical polymerization process using iniferter type control agents according to the teaching of Otu et al., Mackromol. Chem. Rapid. Commun., 3, 127 (1982);
- the controlled radical polymerization process by degenerative iodine transfer according to the teaching of Tatemoto et al., Jap. 50, 127, 991 (1975), Daikin Kogyo Co. Ltd. Japan and Matyjaszewski et al., Macromolecules, 8, 2093 (1995);
- the controlled radical polymerization process using tetraphenylethane derivatives, disclosed by D. Braun et al. in Macromol. Symp. 111, 63 (1996); or else
- the controlled radical polymerization process using organocobalt complexes described by Wayland et al. in J. Am. Chem. Soc. 116, 7973 (1994); and
- the controlled radical polymerization process using diphenylethylene (WO 00/39169 or WO 00/37507).

The controlled or living radical polymerizations using transfer groups or agents (or control agents) having a —S—CS— group (xanthates, dithioesters, etc.) are particularly advantageous.

A first practical method for preparing star copolymers is a "core first" type method. Such a method may comprise the following steps:
- step a) for the polymerization, preferably controlled radical polymerization, in order to obtain a chemically-crosslinked polymeric core, of a composition comprising:
  - optionally at least one monoethylenically unsaturated core monomer (core C units);
  - at least one multiethylenically unsaturated monomer (crosslinking monomer R);
  - a source of free radicals; and
  - a control or transfer agent,
- step b) for the optionally growth of a block A from monoethylenically unsaturated monomers A by polymerization, preferably controlled radical polymerization, in order to obtain a block A, linked to the core; and
- step c) for the growth of a block B from monoethylenically unsaturated monomers B by polymerization, preferably controlled radical polymerization, to obtain a block B linked to the block A.

Step a) of the core-first method is a step of preparing a core or a random microgel. The product obtained is sometimes known as a first generation copolymer or polymer or microgel.

Step b) of the core-first method is a step of growing a first block from the core. The product obtained is sometimes known as a second generation copolymer or polymer or microgel.

Step c) of the core-first method is a step of growing a second block from the previous block. The product obtained is sometimes known as a third generation copolymer or polymer or microgel.

The monoethylenically unsaturated core monomer (core C monomer) may be the same as that from block A. It may optionally be different. In this case, it can be considered as part of the crosslinked block A'. Preferably, it is in both cases a hydrophilic monomer.

A second practical method for preparing star copolymers is an "arm first" type method. Such a method may comprise the following steps:
- step a') of preparing, preferably by controlled radical polymerization, a block copolymer, preferably a diblock copolymer, comprising a block A and a block B, and preferably having a control or transfer group at the end of the block A;
- step b') for the polymerization, preferably controlled radical polymerization, on block A, of a composition comprising:
  - at least one crosslinking monomer R, which is preferably multiethylenically unsaturated;
  - optionally a source of free radicals;
  - optionally a core monomer (core C monomer), which is preferably monoethylenically unsaturated; and
  - a block copolymer from step a').

Step a') of the arm-first method is sometimes known as the preparation of a first generation polymer or copolymer.

Step b') leads to the star copolymer and is sometimes known as production or preparation of a second generation copolymer.

The monoethylenically unsaturated core monomer may be the same as that from block A. It may optionally be different. In this case, it may be considered as being a part of crosslinked block A'. Preferably, it is in both cases a hydrophilic monomer.

The block copolymer from step a') may, for example, be obtained by a process comprising the following steps:

step a'1): preparation of the block B by polymerization, preferably controlled radical polymerization, from a composition comprising:
at least one monoethylenically unsaturated monomer B;
a source of free radicals; and
at least one control agent, being understood that this process is preferably carried out in the absence of multiethylenically unsaturated monomer; then step a'2) production Of the block copolymer, by growth of the block A on the block B, by polymerization, preferably controlled radical polymerization, from the composition comprising:
at least one mononethylenically unsaturated monomer A; and
optionally a source of free radicals, being understood that this process is preferably carried out in the absence of multiethylenically unsaturated monomer.

Such processes for preparing block copolymers are known and have been the subject of many publications.

The multiethylenically unsaturated monomers (crosslinking monomer R), used in the arm-first method or in the core-first method may be chosen from organic compounds comprising at least two ethylenic unsaturations and at most 10 unsaturations and known as being reactive by a radical route.

Preferably, these monomers have two or three ethylenic unsaturations.

Thus, mention may especially be made of acrylic, methacrylic, acrylamido, methacrylamido, vinyl ester, vinyl ether, diene, styrene, α-methylstyrene and allyl derivatives. These monomers may also incorporate functional groups other than the ethylenic unsaturations, for example hydroxyl, carboxyl, ester, amide, amine or substituted amine, mercapto, silane, epoxy or halogen functional groups.

The monomers belonging to these families are divinylbenzene and divinylbenzene derivatives, vinyl methacrylate, methacrylic acid anhydride, allyl methacrylate, ethylene glycol dimethacrylate, phenylene dimethacrylate, diethylene glycol dimethacrylate, triethylene glycol dimethacrylate, tetraethylene glycol dimethacrylate, polyethylene glycol 200 dimethacrylate, polyethylene glycol 400 dimethacrylate, 1,3-butanediol dimethacrylate, 1,4-butanediol dimethacrylate, 1,6-hexanediol dimethacrylate, 1,12-dodecanediol dimethacrylate, 1,3-glycerol dimethacrylate, diurethane dimethacrylate, trimethylolpropane trimethacrylate. For the family of multifunctional acrylates, mention may especially be made of vinyl acrylate, bisphenol A epoxy diacrylate, dipropylene glycol diacrylate, tripropylene glycol diacrylate, polyethylene glycol 600 diacrylate, ethylene glycol diacrylate, diethylene glycol diacrylate, triethylene glycol diacrylate, tetraethylene glycol diacrylate, ethoxylated neopentyl glycol diacrylate, butanediol diacrylate, hexanediol diacrylate, aliphatic urethane diacrylate, trimethylolpropane triacrylate, ethoxylated trimethylolpropane triacrylate, propoxylated trimethylolpropane triacrylate, propoxylated glycerol triacrylate, aliphatic urethane triacrylate, tetramethylolpropane tetraacrylate, dipentaerythritol pentaacrylate. Regarding the vinyl ethers, mention may especially be made of vinyl crotonate, diethylene glycol divinyl ether, 1,4-butanediol divinyl ether, triethylene glycol divinyl ether. For the allyl derivatives, mention may especially be made of diallyl phthalate, diallyldimethylammonium chloride, diallyl maleate, sodium diallyloxyacetate, diallylphenylphosphine, diallyl pyrocarbonate, diallyl succinate, N,N'-diallyltartardiamide, N,N-diallyl-2,2,2-trifluoro-acetamide, the allyl ester of diallyloxyacetic acid, 1,3-diallylurea, triallylamine, triallyl trimesate, triallyl cyanurate, triallyl trimellitate, triallyl-1,3,5-triazine-2,4,6(1H, 3H, 5H)trione. For the acrylamido derivatives, mention may especially be made of N,N'-methylenebisacrylamide, N,N'-methylenebismethacrylamide, glyoxal bisacrylamide, diacrylamidoacetic acid. As regards the styrene derivatives, mention may be made of divinylbenzene and 1,3-diisopropenylbenzene. In the case of diene monomers, mention may be made of butadiene, chloroprene and isoprene.

As multiethylenically unsaturated monomers, N,N'-methylenebisacrylamide, divinylbenzene, ethylene glycol diacrylate or trimethylolpropane triacrylate are preferred.

These multiethylenically unsaturated monomers may be used alone or as mixtures. Furthermore, they are preferably polymerized in the presence of core monomers, preferably monoethylenically unsaturated core monomers.

For the core formation steps (step a or b'), the molar fraction of multiethylenically unsaturated monomers relative to the monoethylenically unsaturated core monomers is advantageously between 0.001 and 1. Preferably, the molar fraction is between 0.01 and 1.

The first steps of the processes (step a or a', more specifically a'1) are carried out in the presence of a source of free radicals. However, for certain monomers, such as styrene, the free radicals enabling the polymerization to be initiated may be generated by the monoethylenically unsaturated monomer at sufficiently high temperatures, generally above 100° C. It is not, in this case, necessary to add an additional source of free radicals.

The useful source of free radicals is generally a radical polymerization initiator. The radical polymerization initiator may be chosen from the initiators conventionally used in radical polymerization. It may be, for example, one of the following initiators:

hydrogen peroxides such as: tert-butyl hydroperoxide, cumene hydroperoxide, tert-butyl peroxyacetate, tert-butyl peroxybenzoate, tert-butyl peroxyoctoate, tert-butyl peroxyneodecanoate, tert-butyl peroxyisobutyrate, lauroyl peroxide, tert-amyl peroxypivalate, tert-butyl peroxypivalate, dicumyl peroxide, benzoyl peroxide, potassium persulfate and ammonium persulfate;

azo compounds such as: 2,2'-azobisisobutylronitrile, 2,2'-azobis(2-butanenitrile), 4,4'-azobis(4-pentanoic acid), 1,1'-azobis(cyclo-hexanecarbonitrile), 2-t-butylazo-2-cyanopropane, 2,2'-azobis[2-methyl-N-(1,1)-bis(hydroxymethyl)-2-hydroxy-ethyl]propionamide, 2,2'-azobis(2-methyl-N-hydroxy-ethyl]propionamide, 2,2'-azobis(N,N'-dimethyleneiso-butyramidine)dichloride, 2,2'-azobis (2-amidino-propane)dichloride, 2,2'-azobis (N,N'-dimethyleneiso-butyramide), 2,2'-azobis(2-methyl-N-[1,1-bis(hydroxyl-methyl)-2-hydroxyethyl]propionamide), 2,2'-azo-bis(2-methyl-N-[1,1-bis (hydroxymethyl)ethyl]propion-amide), 2,2'-azobis(2-methyl-N-(2-hydroxyethyl)propion-amide] and 2,2'-azobis(isobutyramide)dihydrate;

redox systems comprising combinations such as:
mixtures of hydrogen peroxide, alkyl peroxide, peresters, percarbonates and the like and of any iron salts, titanium salts, zinc formaldehyde sulfoxylate or sodium formaldehyde sulfoxylate, and reducing sugars;
alkali metal or ammonium persulfates, perborate or perchlorate in combination with an alkali metal bisulfite, such as sodium metabisulfite, and reducing sugars, and
alkali metal persulfates in combination with an arylphosphinic acid such as benzenephosphonic acid and the like, and reducing sugars.

The amount of initiator to be used is preferably determined so that the amount of radicals generated is at most 50 mol %, preferably at most 20 mol %, relative to the amount of control or transfer agent.

The polymerizations may be carried out in any suitable physical form, for example in solution in the water or in a solvent, for example an alcohol or THF, in emulsion in water (process known as "latex"), in bulk, if necessary by controlling the temperature and/or the pH in order to make the species liquid and/or soluble or insoluble.

After carrying out the preparation processes described above, it is mentioned that it is possible to deactivate or remove or destroy possible transfer groups present in the star copolymer, for example by hydrolysis, ozonolysis, or reaction with amines.

It is stated that the copolymers according to the invention are preferably obtained directly after the polymerization and optional deactivation, removal or destruction of transfer groups, without a step of functionalizing the copolymer after the polymerization. Therefore the hydrophobic block B is preferably different from an adduct of the reaction between the functionalizable groups borne by the polymerized units and a hydrophobic compound. The hydrophobic block B is especially different from a block comprising hydrophobic units which are adducts of the reaction between glycidyl methacrylate and para-nitrobenzoic acid type units.

Surfactant

The surfactant may, in addition, be an anionic or nonionic surfactant. It may also be a mixture of surfactants comprising an anionic surfactant and/or a nonionic surfactant.

According to one embodiment, which is advantageous when the block A is hydrophilic and the block B is hydrophobic, the composition comprises a nonionic surfactant.

According to another embodiment, which is advantageous when the block A is hydrophilic and the block B is hydrophilic or cationic, the composition comprises an anionic surfactant.

As nonionic surfactants, mention is especially made of:
polyalkoxylated (ethoxylated, propoxylated, ethopropoxylated) phenols substituted by at least one $C_4$-$C_{20}$, preferably $C_4$-$C_{12}$, alkyl radical or substituted by at least one alkylaryl radical of which the alkyl part is a $C_1$-$C_6$ alkyl. More particularly, the total number of alkoxylated units is between 2 and 100. By way of example, mention may be made of polyalkoxylated mono-, di- or tri(phenylethyl) phenols or polyalkoxylated nonylphenols. Among the ethoxylated and/or propoxylated, sulfated and/or phosphated di- or tristyrylphenols, mention may be made of ethoxylated di(1-phenylethyl)phenol, containing 10 oxyethylenated units, ethoxylated di(1-phenylethyl)phenol, containing oxyethylenated units; sulfated ethoxylated di(1-phenylethyl)phenol, containing 7 oxyethylenated units, ethoxylated tri(1-phenylethyl) phenol, containing 8 oxyethylenated units, ethoxylated tri(1-phenylethyl)phenol, containing 16 oxyethylenated units, sulfated ethoxylated tri(1-phenylethyl)phenol, containing 16 oxyethylenated units, ethoxylated tri(1-phenylethyl)phenol containing 20 oxyethylenated units, phosphated ethoxylated tri(1-phenylethyl)phenol, containing 16 oxyethylenated units;
optionally polyalkoxylated (ethoxylated, propoxylated, ethopropoxylated) $C_6$-$C_{22}$ fatty acids or alcohols. In the case where there are present, the number of alkoxylated units is between 1 and 60. The term "ethoxylated fatty acid" includes both products obtained by ethoxylation of a fatty acid by ethylene oxide and those obtained by esterification of a fatty acid with a polyethylene glycol;
polyalkoxylated (ethoxylated, propoxylated, ethopropoxylated) triglycerides of plant or animal origin. Thus, triglycerides derived from lard, tallow, ground nut oil, butter oil, cotton seed oil, linseed oil, olive oil, palm oil, grape seed oil, fish oil, soybean oil, castor oil, rapeseed oil, copra oil, or coconut oil, and comprising a total number of alkoxylated units between 1 and 60, are suitable. The term "ethoxylated triglyceride" is directed both toward the products obtained by ethoxylation of a triglyceride by ethylene oxide and toward those obtained by transesterification of a triglyceride with a polyethylene glycol;
optionally polyalkoxylated (ethoxylated, propoxylated, ethopropoxylated) sorbitan esters, more particularly cyclized sorbitol esters of $C_{10}$ to $C_{20}$ fatty acids such as lauric acid, stearic acid or oleic acid, and comprising a total number of alkoxylated units between 2 and 50; and
polyalkoxylated (ethoxylated, propoxylated or ethopropoxylated) alkyls or alcohols, for example linear or branched $C_4$-$C_{30}$, preferably $C_{10}$-$C_{19}$, preferably $C_{12}$-$C_{16}$ alkyls or alcohols comprising 2 to 30 ethoxy and/or propoxy units, preferably 2 to 10 ethoxy units.

Polyethoxylated nonionic surfactants may, advantageously be used.

As anionic surfactants, mention is especially made of:
alkylsulfonic acids, arylsulfonic acids, optionally substituted by one or more hydrocarbon-based groups, and of which the acid function is partially or completely salified, such as $C_8$-$C_{50}$, more particularly $C_6$-$C_{30}$, preferably $C_{10}$-$C_{22}$ alkylsulfonic acids, benzenesulfonic acids, naphthalenesulfonic acids, substituted by one to three $C_1$-$C_{30}$, preferably $C_4$-$C_{16}$, alkyl groups and/or $C_2$-$C_{30}$, preferably $C_4$-$C_{16}$ alkenyl groups;
monoesters or diesters of alkylsulfosuccinic acids, of which the linear or branched alkyl part is optionally substituted by one or more hydroxylated and/or alkoxylated (preferably ethoxylated, propoxylated or ethopropoxylated) linear or branched $C_2$-$C_4$ groups;
phosphate esters more particularly chosen from those comprising at least one linear or branched, saturated, unsaturated or aromatic hydrocarbon-based group comprising 8 to 40, preferably 10 to 30, carbon atoms, optionally substituted by at least one alkoxylated (ethoxylated, propoxylated, or ethopropoxylated) group. Moreover, they comprise at least one monoesterified or diesterified phosphate ester group so that it is possible to have one or two free, or partially or completely salified, acid groups. The preferred phosphate esters are of the type of monoesters and diesters of phosphoric acid and of alkoxylated (ethoxylated and/or propoxylated) mono-, di- or tristyrylphenol, or of alkoxylated (ethoxylated and/or propoxylated) mono-, di- or trialkylphenol, optionally substituted by one to four alkyl groups; of phosphoric acid and of an alkoxylated (ethoxylated or ethopropoxylated) $C_8$-$C_{30}$, preferably $C_{10}$-$C_{22}$ alcohol;

of phosphoric acid and of a nonalkoxylated $C_8$-$C_{22}$, preferably $C_{10}$-$C_{22}$, alcohol;

sulfate esters obtained from saturated or aromatic alcohols, optionally substituted by one or more alkoxylated (ethoxylated, propoxylated or ethopropoxylated) groups, and for which the sulfate functional groups are present in free, or partially or completely neutralized, form. By way of example, mention may be made of the sulfate esters obtained more particularly from saturated or unsaturated $C_8$-$C_{20}$ alcohols, which may comprise 1 to 8 alkoxylated (ethoxylated, propoxylated, ethopropoxylated) units; the sulfate esters obtained from polyalkoxylated phenol, substituted by 1 to 3 saturated or unsaturated $C_2$-$C_{30}$ hydroxycarbon-based groups, and in which the number of alkoxylated units is between 2 and 40; the sulfate esters obtained from polyalkoxylated mono-, di- or tristyrylphenol in which the number of alkoxylated units varies from 2 to 40.

The anionic surfactants may be in acid form (they are potentially anionic) or in a partially or completely salified form, with a counterion. The counterion may be an alkali metal, such as sodium or potassium, an alkaline-earth metal, such as calcium or else an ammonium ion of formula $N(R)_4^+$ in which the R groups, being identical or different, represent a hydrogen atom or a $C_1$-$C_4$ alkyl radical optionally substituted by an oxygen atom.

The composition may also comprise cationic, amphoteric and/or zwitterionic surfactants.

Compositions—Physical Form—Gels

The star copolymer, the optionally present surfactant and their amounts are preferably such that the composition is in the form of a viscoelastic gel.

For the embodiment in which the block A is hydrophilic and the block B is hydrophobic, the nonionic surfactant and its amount are preferably such that the composition is in the form of a viscoelastic gel.

In this embodiment, it is possible to use, as a parameter, the number Z, that expresses the ratio between the molar amount of surfactant $n_{surf}$ and the molar amount of block B units $n_{block\ B}$ ($Z=n_{surf}/n_{block\ B}$, the number in moles of block B units). Advantageously, Z is such that the composition is in the form of a viscoelastic gel at room temperature, or else such that the composition forms a viscoelastic gel under the effect of heat. During the addition of surfactant, Z increases. In advantageous modes, the formation of a gel, and/or its strength, varies according to Z, gelling being highest at a $Z_{max}$ value of around 1. It is thus possible to control the formation of a gel, and/or its strength, by control, of the Z parameter, advantageously by simple addition of surfactant. For a given Z value, gelling may be obtained by heating. It is thus possible to control the formation of a gel, and/or its strength. At a given Z, the strength of the gel increases when the temperature increases.

For the embodiment in which the block A is hydrophilic and the block B is hydrophilic or cationic, the anionic surfactant and its amount are preferably such that the composition is in the form of a viscoelastic gel.

In this embodiment, it is possible to use, as a parameter, the number Z, that expresses the ratio between the molar amount of surfactant $n_{surf}$ and the molar amount of block B units $n_{block\ B}$ ($Z=n_{surf}/n_{block\ B}$). Advantageously, Z is such that the composition is in the form of a viscoelastic gel at room temperature. During the addition of surfactant, Z increases. In advantageous modes, the formation of a gel, and/or its strength, varies according to Z, gelling being highest at a $Z_{max}$ value of around 1. It is thus possible to control the formation of a gel, and/or its strength, by control, of the Z parameter.

Preferably:

the composition comprises from 2 to 10% by weight of the total of the star copolymer and of the surfactant; and the weight ratio between the surfactant and the star copolymer is between 0 and 50/50, preferably between 10/90 and 50/50.

According to one advantageous embodiment, the composition comprises:

water;

0.1 to 20%, preferably 0.5 to 150, preferably 1 to 5%, for a copolymer of which the block. B is a hydrophobic block or from 2 to 12% for a copolymer of which the block B is a cationic block, by weight of the total (copolymer+ optional surfactant); and the weight ratio between the copolymer and the surfactant, if it is present, being greater than ⅓, preferably between ½ and ¾.

The compositions according to the invention have advantageous rheological properties at relatively low copolymer levels, and may especially form shear-thinning and heat-thickening rheological systems. In particular, they may have a behavior in which the strength of the gel increases with temperature. Such a property, in addition at relatively low copolymer level, is unexpected and may enable very advantageous applications or uses, especially in the fields for the exploitation of oil or gas deposits.

Thus, the composition may be a fluid for the exploitation of oil or gas deposits, preferably a fracturing fluid. Such fluids, and such uses are described below.

Other Ingredients—pH

The composition according to the invention may, in addition, comprise at least one salt that is soluble in the composition, present at a content of at least 0.01% by weight relative to the weight of the composition and below the solubility limit of the salt or salts in said composition.

As suitable soluble salts, mention may be made, amongst others, of alkali metal or alkaline-earth metal chlorides, and alkali metal iodides, sulfates, carbonates, bicarbonates, phosphates and silicates, alone or as a mixture. The water of the composition may in addition be seawater, or water comprising brine, or salts included in formations that are drilled through for oil or gas production.

The composition may especially comprise agents for modifying the pH or for control of the pH. The pH is advantageously from 5 to 9.

The composition may, in addition, comprise ingredients or uses in the fields of use for copolymers already mentioned above, and in the fields of use for compositions given below, in particular in the field of oil or gas production.

Process for Preparing Compositions and/or for Control of the Formation of Gels

The compositions according to the invention may be prepared by bringing together various ingredients, especially water, the star copolymer, and optionally the surfactant. It is mentioned that it is possible to use premixes of some of the ingredients or parts of these ingredients. Bringing together the ingredients may be followed by more or less vigorous stirring, and/or by heating, and/or by addition of surfactant (or an additional amount of surfactant).

A process for controlling the formation of viscoelastic gels, for example a process for preparing such gels, may for example comprise the following steps:

a) preparing an aqueous composition as described above, comprising:
  water;
  a copolymer as described above;
  optionally a surfactant as described above; and b) forming a gel by stirring and/or by addition of surfactant and/or heating.

Without wishing to be tied to any one theory, it is believed that a star copolymer (of which the block B is a hydrophobic block forms a double network comprising a family of chemical crosslinking nodes composed of cores and a family of physical crosslinking nodes composed of nodules (micelles) comprising B blocks coming from different star copolymers. In the presence of water, it is believed that the (double) network swells to form a gel. By adding water gradually, the network may swell to form a gel, up to a limit, linked to the volume fraction of water, at which the swelling is maximal and any additional introduction of water leads to a composition comprising one phase in gel form and a separate aqueous phase. Beyond this limit, more vigorous or longer stirring, and/or heating, may make it possible to obtain a single phase gel. It is believed that stirring and/or heating make it possible to open the nodules (micelles) of the network, and therefore to incorporate more water. The possibility of incorporating significant amounts of water makes it possible to produce compositions comprising a low proportion of star copolymer, which is economically advantageous (the copolymer is more active).

It is believed that the presence of nonionic surfactant in the system modulates interactions between B blocks, and/or modulates the formation of nodules (micelles). These modulations may, for example, induce looser interactions between the B blocks and/or induce greater possibilities of opening the nodules (micelles) of the network, and therefore enable more water to be incorporated. It is mentioned that beyond a certain amount of surfactant, it is possible that the second family of nodes disappears (nodules completely open). It may therefore be preferred to use an effective quantity of surfactant. Alternatively, if the surfactant is a surfactant having an aggregation number that is dependent on temperature (for example a nonionic surfactant such as a polyethoxylated alcohol) and if an amount above the effective amount is used at one temperature, it is possible to increase the temperature to form a gel. It is believed that heating induces a reorganization or reappearance of the nodules (by aggregation of the surfactant with temperature). It is thus possible to produce a reversible thermogelling system.

Thus, according to one embodiment, it is possible to form a gel by the following process:

a) an aqueous composition is prepared comprising water and the star copolymer and which does not comprise any surfactant; and b) it is vigorously stirred and/or heated to form a gel.

This embodiment may especially be used with copolymers of which the block B is hydrophobic.

According to another embodiment:

a) an aqueous composition is prepared comprising water and the star copolymer and which does not comprise any surfactant; and b) the gel is formed by addition of an effective amount of surfactant.

This embodiment may especially be used with copolymers of which the block B is hydrophobic or cationic.

According to another embodiment:

a) a composition is prepared comprising water, the star copolymer and an amount of surfactant above the effective amount to form a gel; and b) the gel is formed by heating.

This embodiment may especially be used with copolymers of which the block B is hydrophobic, and the surfactant is a nonionic surfactant, for example a polyalkoxylated alkyl, preferably a polyethoxylated alcohol.

Thus:
  the process may be used during oil or gas production, the aqueous composition being a fracturing fluid, and the possible heating being provided by the temperature of the oil or gas.

Use of the Compositions

The compositions may especially be compositions used in the cosmetics field (for example shampoos, conditioners, shower gels), the homecare field, the field of industrial or institutional cleaning (for example products for cleaning hard surfaces or washing liquids), or in the field of oil or gas production.

Thus, an additional subject of the present invention is the use of the composition that has just been explained as a fluid for oil or gas production, such as a drilling fluid or a stimulation fluid. The use is particularly advantageous for the stimulation of oil wells, and more particularly for fracturing. The invention therefore preferably relates to the use of the composition as a fracturing fluid. The use as a stimulation fluid, according to the invention, and more particularly as a fracturing fluid, is particularly advantageous at relatively high exploitation temperatures of around 120° C. to 150° C. The pH is generally from 8 to 10, and often above 9. With a fluid according to the invention, significant and/or rapid degradation of the viscoelastic properties, which could make said fluid difficult to use, are not observed. The fracturing operation may advantageously be a fracturing with carbon dioxide, in which liquid carbon dioxide is injected into the fracturing fluid. The use as a fracturing fluid may advantageously be a use as a fracturing fluid with a gas such as air, nitrogen, or carbon dioxide, the fluid comprising, for example, liquid carbon dioxide.

The use of a fracturing fluid consists in injecting the fluid into the wells at a flow rate, a pressure and a shear rate that are sufficient to create cracks in the rocks that are passed through, and thus to increase the permeability of the rocks comprising the oil or gas.

Fracturing techniques are especially described in patent. U.S. Pat. No. 5,551,516 and in "Oilfield Applications", Encyclopedia of Polymer Science and Engineering, Vol. 10, pp. 328-366.

The fracturing fluid in general comprises solid particles whose role is to keep the cracks created during the fracturing operation open. The particles are dispersed, for example in suspension, in the fluid, and transported into the cracks. They prevent these from closing back up when the pressure decreases in the rock, due to a degradation, undergone or produced, of the viscosity of the fluid, or due to a voluntary operation on the flow rate, the pressure or the shear rate.

More particularly, these solid particles may be chosen from sand, quartz, sintered bauxite, glass beads, ceramic beads, aluminum particles, cockleshell fragments, etc. The particle size of these particles is typically from 20-40 mesh. Usually the amount of solid particles in the fluid is between 0.2 and 0.3 kg of particles per liter of fracturing fluid.

It should be noted that the fracturing fluids may comprise thermal stabilizing agents, such as for example sodium thiosulfates and thiosulfites, thiourea, methanol, ethylene glycol, isopropanol, etc.

Where necessary, the fracturing fluid may comprise an additive that limits the swelling of clays, such as for example potassium chloride, calcium chloride, calcium sulfate (gypsum), etc. Generally, the content of this type of compounds, when they are present, is between 1 and 4% by weight of the fluid.

The fracturing fluid may of course comprise other components normally used in the field, such as antifoaming agents or scale inhibitors.

These fluids are obtained by simple mixing of the various components which form them in the desired proportions.

The invention similarly relates to the use of the aqueous fluid as a drilling or stimulation fluid, in particular as a fracturing fluid, in the field of oil or gas production.

Besides the copolymer of the invention and optionally the surfactant, the drilling fluids may comprise thinning agents or dispersants.

Thus, polyphosphates, tannins, lignosulfonates, lignin derivatives, peats and lignites, polyacrylates Or polynaphthalene sulfonates can be incorporated into the composition of drilling fluids, alone or as a mixture.

The amount of thinning agent or dispersant is variable. By way of indication, this amount is between 0 and 1% relative to the weight of the fluid.

The drilling fluid may, in addition, comprise at least one filtrate reducer, which are compounds that are adsorbed on the rocks forming the walls of the well, therefore limiting the diffusion through the drilling walls of the various components that make up the fluid.

As examples of compounds of this type, mention may be made, nonlimitingly, of cellulose compounds, polyacrylamides, high molecular weight polyacrylates, succinoglycans, native starch or its derivatives, or carbon. Among the cellulose compounds, chemically-modified or unmodified celluloses such as carboxymethyl celluloses, hydroxyethyl celluloses or carboxyethyl-hydroxyethyl celluloses are compounds that are suitable as filtrate reducers. Of course nothing prevents these products from being used in combination if the conditions make it necessary.

The amount of filtrate reducer strongly depends on the nature of the rocks that are passed through. However, by way of indication, it is normally between 0 and 1% relative to the total weight of the fluid.

The fluid according to the invention may comprise an oxygen scavenger. The object of this type of additive is to trap the oxygen present in the drilling muds, which may lead to a degradation of certain additives.

Among products of this type, mention may be made, for example, of hydroxylamines, hydrazine, sulfites, bisulfites or hydrosulfites. Preferably, hydrazine is used, which may be in an anhydrous or hydrated form, in the form of salts such as for example chlorides or sulfates, or else in the carbohydrazide form.

Generally the content of additive of this type varies between 0 and 0.25% by weight of the fluid.

The fluid may comprise, in addition, at least one weighting compound and/or at least one mineral colloid. The weighting components help to maintain a sufficient hydrostatic pressure in the well and to keep the rocks entrained during the drilling operation in suspension. Such compounds are conventionally chosen from the aforementioned soluble salts and from salts of low or very low solubility. Among the salts of low solubility, mention may be made, nonlimitingly, of alkaline-earth metal sulfates, silicates or carbonates, such as barium sulfate or calcium carbonate.

It is similarly possible to use alkaline-earth metal or zinc bromides, such as potassium bromide or zinc bromide. It is also possible to use iron oxides or sulfide or subarsenate. It is also possible to use strontium sulfate, or even in certain high-density cases, galena (lead sulfide).

The mineral colloids, which are compounds that are substantially insoluble under the conditions of use of the fluid according to the invention, are agents that modify the rheology of the medium and make it possible to keep the cuttings suspended in the latter. Attapulgite, barite or bentonite, alone or as a mixture, are the most commonly used examples thereof. It should be noted that if a fluid is used that comprises a mineral colloid, the latter will preferably be attapulgite.

The contents of weighting compounds and of mineral colloids depend on several factors which are not solely technical. This is because, although these contents are of course determined according to the nature of the ground which is passed through, the scale of the cost generated by the use of these additives is taken into account (whether or not they are present on site, cost, etc.).

It is also possible to add to the fluid, if necessary, mineral salts to promote the precipitation of certain ions, if they are present, and in particular divalent ions. Mention may be made, for example, of the addition of sodium carbonate to precipitate calcium, or sodium bicarbonate to precipitate lime, especially during redrilling operations in cement. Mention may also be made of the addition of gypsum or of calcium chloride to limit the swelling of clays, the addition of calcium hydroxide or slate lime, to remove bicarbonates from muds contaminated by carbon dioxide.

The content of salts is a function of the rocks passed through and of the water available on the extraction site and the operations can be carried out in the presence of fluids saturated with salts.

Of course, the fluid according to the present invention may comprise the usual additives from the class of high molecular weight polysaccharides, such as succinoglycan, wellan or gellan, which are useful as viscosifying agents.

Other conventional additives for oil production applications may be incorporated into the composition of the fluid (drilling fluid or stimulation fluid, such as a fracturing fluid). Thus, mention may be made of the agents for the transfer of free radicals, such as the lower alcohols, thioureas, or hydroquinone; biocides, chelating agents, surfactants, antifoaming agents, or corrosion inhibitors, for example.

Finally, it is mentioned that the aqueous fluid according to the invention may be used as a fluid for evacuating excavation products, especially in the industries for construction at depth, for producing tunnels or wells, or in the mining industry. The excavation products are in these applications suspended in the fluid, by introducing the fluid into the area from where they must be eliminated. Document U.S. Pat. No. 5,439,317 gives examples of applications for excavations.

Other details or advantages of the invention will become apparent in view of the nonlimiting examples that follow.

EXAMPLE

Synthesis Examples

In the synthesis examples given below, the polymerization reactions were carried out under a slight purge of argon in simple glass equipment submerged in an oil bath preheated to 70° C.

As free-radical generators, 4,4'-azobis (4-cyano-pentanoic acid) (ACP), 4,4'-azobisisobutyronitrile (AIBN) or sodium persulfate ($Na_2S_2O_8$) were used.

The crosslinking used in the following examples was N,N'-methylenebisacrylamide (MBA).

An "arm first" type method was carried out by preparing a diblock copolymer, known as a "first generation polymer", (step a'), then crosslinking by polymerization with a crosslinker to form a core (step b').

The conversion of the first generation polymer was evaluated by analysis of the (co)polymers by size exclusion chromatography (SEC) or by gas chromatography (GC) of the residual monomers, or by high performance liquid chromatography (HPLC). The number-average molecular weights $M_n$ (g/mol) were expressed in polyethylene oxide equivalents for the hydrophilic blocks and in polystyrene equivalents for the hydrophobic blocks. The molecular weight distribution was evaluated by the polydispersity index ($I_p$) corresponding to the ratio of the weight-average molecular weight to the number-average molecular weight ($I_p = M_w/M_n$).

These examples showed that the number-average molecular weight of the first generation polymers derived from the radical polymerization of the ethylenically unsaturated monomers was determined by the initial molar ratio of the monomer and the control agent (xanthate). UV detection at 290 nm in SEC chromatography indicated the presence of the fragment of control agent at the end of the polymer chains, characteristic of the controlled nature of the polymerization.

Abbreviations of the monomers in the examples:
AA=acrylic acid;
BUA=butyl acrylate;
ADAMQUAT=ethyl acrylate of trimethylammonium methyl sulfate;
AM=acrylamide; and
MBA=N,N'-methylenebisacrylamide.

Example 1

Preparation of a [P(AA-MBA) Core]-[P(AA-block-BUA) Branches] 42 Star Copolymer (Number of Branches Measured Around 42)

A'/ Synthesis of the First Generation P(BUA(5 k)-block-AA(10 k)) Diblock Copolymer In a two-neck round-bottom flask topped with a condenser, 4.17 g ($2 \times 10^{-2}$ mol) of xanthate EtOC(=S)SCH($CH_3$)COO$CH_3$ was added to 100.0 g (0.78 mol) of butyl acrylate BUA in 104.82 g of ethanol. The reaction mixture was subjected to argon sparging for 20 min, then brought to 70° C. At this temperature, 0.656 g ($4 \times 10^{-3}$ mol) of AIBN, dissolved in 3 ml of ethanol, was introduced dropwise over a period of 45 min. After reacting for 3 hours at 70° C., an aliquot was removed to be analyzed by SEC. Next, 0.56 g ($2 \times 10^{-3}$ mol) of ACP was added to the reaction mixture. A mixture of 200 g (2.78 mol) of acrylic acid AA, and 1.12 g ($4 \times 10^{-3}$ mol) of ACP in 135.20 g of ethanol was continuously introduced over a period of 2 h to the reaction mixture. At the end of the continuous introduction, the heating was continued for 2 h before a last addition of 0.12 g ($3.84 \times 10^{-4}$ mol) of ACP. Finally, the heating was continued for an additional 4 h.

SEC Analysis:
First PBUA block: $M_n$=4900 g/mol$^{-1}$ and $I_p$=1.63

After hydrolyzing the P(BUA-b-AA) diblock with sodium hydroxide (NaOH), $M_n$=10 120 g/mol$^{-1}$ and $I_p$=1.70 were obtained, which corresponds to a second PAA block of $M_n$=7525 g/mol$^{-1}$.

B'/ Production of the [P(AA-MBA) Core]-[P(AA(10 k)-block-BUA(5 k)) Branches] Star Polymer In a two-neck round-bottom flask topped with a condenser, 22 g of an ethanol solution containing 45.45 wt % of P(BUA(5 k)-block-AA(10 k)) diblock polymer (namely 10 g of diblock solids) was added to 78.0 g of ethanol. The reaction mixture was subjected to an argon sparging for 20 min, then brought to 70° C. At this temperature 0.0374 g ($1.33 \times 10^{-4}$ mol) of ACP was added. A mixture of 1.00 g ($1.39 \times 10^{-2}$ mol) of acrylic acid and 2.05 g ($1.33 \times 10^{-2}$ mol) of MBA in 28.15 g of ethanol was then added continuously into the reaction mixture over a period of 2 h. At the end of the continuous introduction, the heating was maintained for 2 h before a last addition of 0.0374 g ($1.33 \times 10^{-4}$ mol) of ACP. Finally, the heating was maintained for an additional 6 h.

The coefficient for theoretical branch generation was around 20.

The average molecular weight measured was around $M_{star}$=1.14×10$^6$ g/mol.

The number of arms measured was around 42.

Example 2

Preparation of a [P(AM-MBA) Core]-[P(AM-block-ADAMQUAT) Branches] Star Copolymer—Number of Branches Not Measured A'/ Synthesis of the First Generation P(ADAMQUAT(5.4 k)-block-AM(19.6 k)) Diblock Copolymer In a two-neck round-bottom flask topped with a condenser, 1.93 g ($9.3 \times 10^{-3}$ mol) of xanthate EtOC(=S)SCH($CH_3$)COO$CH_3$ was added to 87.71 g of a 57 wt % solution of ADAMQUAT in water, (namely 50 g (0.186 mol) of ADAMQUAT), and to a mixture comprising 39.27 g of ethanol and 12.50 g of deionized water. The reaction mixture was brought to 70° C. At this temperature, 0.424 g ($1.86 \times 10^{-3}$ mol) of ammonium peroxodisulfate ($Na_2S_2O_8$) was added in one go. After heating for 6 hours at 70° C., the reaction mixture was cooled to room temperature and precipitated in a large excess of dichloromethane. After filtering and drying, the P(ADAMQUAT) was redissolved in the deionized water to obtain a 57 wt % solution of solids.

Introduced into a two-neck round-bottom flask topped with a condenser were 35.09 g of this aqueous solution of P(ADAMQUAT), namely 20 g of dry polymer in 15.09 g of deionized water.

The solution was heated to 70° C. and then 0.212 g ($9.3 \times 10^{-4}$ mol) of ammonium peroxodisulfate ($Ne_2S_2O_6$) was introduced. Added continuously over 3 h were 175.76 g of a 30 wt % aqueous solution of acrylamide (AM), namely 52.73 g (0.743 mol) of AM. During this continuous introduction of AM, two additions were made, after one hour and after two hours, of 0.106 g ($4.64 \times 10^{-4}$ mol) of ammonium peroxodisulfate ($Na_2S_2O_8$). At the end of the continuous addition of AM, the heating was maintained for an additional 2 h.

B'/ Production of the [P(AM-MBA) Core]-[P(AM(19.6 k)-block-ADAMQUAT(5.4 k)) Branches] Star Polymer:

In a two-neck round-bottom flask topped with a condenser, 28.57 g of an aqueous solution containing 35 wt % of P(AD-AMQUAT (5.4 k)-block-AM (19.6 k)) diblock polymer (namely 10 g of diblock solids) were added to 71.85 g of deionized water. The mixture was brought to 70° C. At this temperature, 0.0233 g ($1.02 \times 10^{-4}$ mol) of ammonium peroxodisulfate ($Na_2S_2O_8$) was added. A mixture containing 8.50 g of a 30 wt % aqueous solution of acrylamide (namely 2.55 g ($3.59 \times 10^{-2}$ mol) of acrylamide), 0.393 g ($2.55 \times 10^{-3}$ mol) of MBA and 0.0233 g ($1.02 \times 10^{-4}$ mol) of ammonium peroxodisulfate ($Na_2S_{2/O8}$) in 20.55 g of deionized water was added continuously over 3 h to the reaction mixture. At the end of the continuous introduction, the annealing was maintained for an additional 9 h.

Example 3

Preparation of a Gel Comprising the Star Polymer from Example 1

Mixed in a beaker were:
97 g of deionized water;
1.70 g (dry weight) of polymer from example 1;
0.31 g of sodium hydroxide NaOH; and
1.30 g of C13EO6 surfactant ($CH_3$—$(CH_2)_{12}$—(O—$CH_2$—$CH_2)_6$—OH).

After stirring, the present formulation gave a transparent single phase gel.

The rheological properties of this gel were evaluated on a $CSL^2 100$ Carrimed Rheometer from TA Instruments, using a cone-plate geometry (diameter=4 cm, cone angle–1°.

At a constant temperature of around room temperature, 25° C., the behavior was studied at increasing shear rate: it was observed that the solution had a viscosity of 2000 cP for a low shear rate, typically below 0.01 s$^{-1}$, whereas, at a high rate, typically 100 s$^{-1}$, it had a viscosity of 630 cP.

At a high constant shear rate of 100 s$^{-1}$, the behavior was studied at increasing temperature: at room temperature, the solution had a viscosity of 600 cP; its viscosity increased with the temperature up to 800 cP at high temperature, 75° C.

This increase in the viscosity with temperature constitutes a new remarkable signature.

The following measurement was also carried out:
G'=250 Pa, G"=50 Pa, at an oscillation frequency of 1 Hz, at a deformation percentage of 1% and at 25° C.

Example 4

Preparation of a Gel Comprising the Star Polymer from Example 2

Mixed in a beaker were:
deionized water;
5% by (dry) weight of the polymer from example 2; and
1% by weight of SDS surfactant.
A gel was obtained.

Although this was carried out similarly with 2.5% of polymer and 0.5% of SDS, the mixture was viscous and became a gel after 4:3 hours.

G'>G" was obtained at an oscillation frequency of 1 Hz, at a deformation percentage of 1% and at 25° C.

The presence of 10-2 M NaCl salt did not influence this behavior, the salt did not destroy these gels.

The invention claimed is:

1. A star copolymer comprising a core and, at the periphery of the core, macromolecular branches each comprising:
an intermediate block A linked to the core or at least partly included in the core; and
a peripheral block B linked to the block A; wherein the weight ratio between block A and block B being greater than or equal to 40/60;
the blocks A and B being such that:
block A is hydrophilic and block B is hydrophobic; or
block A is hydrophilic and block B is hydrophilic, cationic or potentially cationic
wherein the core is a chemically-crosslinked polymeric organic core.

2. An aqueous composition comprising:
water;
a star copolymer as defined by claim 1; and
optionally, at least one surfactant.

3. The composition as defined by claim 2, wherein:
block A is hydrophilic and block B is hydrophobic; and
the composition comprises a nonionic surfactant.

4. The composition as defined by claim 2, wherein the nonionic surfactant comprises a $C_{10}$-$C_{18}$ polyethoxylated alcohol.

5. The composition as defined by claim 2, wherein:
block A is hydrophilic and block B is hydrophilic cationic or potentially cationic; and
the composition comprises an anionic surfactant.

6. The composition as defined by claim 2, wherein:
the composition comprises from 2 to 10% by weight of the total of the star copolymer and of the surfactant; and
the ratio between the surfactant and the star copolymer is between 0 and 50/50.

7. The composition as defined by claim 2, in the form of a viscoelastic gel.

8. The composition as defined by claim 2, wherein the star copolymer, the surfactant, if present, and the amounts thereof, are such that it is in the form of a viscoelastic gel.

9. The composition as defined by claim 2, comprising a fluid for oil or gas production.

10. The composition as defined by claim 2, wherein:
the composition comprises from 2 to 10% by weight of the total of the star copolymer and of the surfactant; and
the ratio between the surfactant and the star copolymer is between 10/90 and 50/50.

11. The star copolymer as defined by claim 1, wherein block A is hydrophilic and block B is hydrophobic.

12. The star copolymer as defined by claim 11, wherein block A has a molar mass between 5,000 and 20,000 g/mol, and block B has a molar mass between 2,000 and 10,000 g/mol.

13. The star copolymer as defined by claim 1, wherein:
block A is hydrophilic and block B is cationic or potentially cationic.

14. The star copolymer as defined by claim 13, wherein block A has a molar mass between 5,000 and 70,000 g/mol and block B has a molar mass between 1,000 and 20,000 g/mol.

15. A method for controlling the formation of viscoelastic gels comprising the following steps:
a) preparing an aqueous composition comprising:
water;
a star copolymer as defined by claim 1;
optionally, a surfactant; and
b) forming a gel by stirring and/or by addition of surfactant and/or heating.

16. The method as defined by claim 15, wherein:
the composition does not comprise surfactant; and
the gel is formed by addition of an effective amount of surfactant.

17. The method as defined by claim 15, wherein:
block B is hydrophobic;
the composition comprises an amount of nonionic surfactant greater than the affective amount to form a gel; and
the gel is formed by heating.

18. The method as defined by claim 15, wherein:
the method is used during oil or gas production;
the aqueous composition is a fracturing fluid; and
the optional heating is provided by the temperature of the oil or gas.

19. The star copolymer as defined by claim 1, wherein the block A comprises hydrophilic units $A_{philic}$ deriving from monomers selected from among the following monomers;
neutral hydrophilic monomers $A_N$ from which $A_N$ units may derive;
hydroxyethylacrylates and methacrylates, acrylamide, methacrylamide;
vinyl alcohol;
anionic or potentially anionic monomers $A_A$, from which anionic or potentially anionic units $A_A$ may derive;
acrylic acid, methacrylic acid, maleic acid or anhydride, and their water soluble salts;
2-sulfooxyethyl methacrylate, vinylbenzene sulfonic acid, allylsulfonic acid, 2-acrylamido-2-methylpropanesulfonic acid, sulfoethyl acrylate or methacrylate, sulfopropyl acrylate or methacrylate and their water-soluble salts;
if block B is hydrophobic, the hydrophilic cationic or potentially cationic monomers $A_C$ from which the $A_C$ units may derive.

20. The star copolymer as defined by claim 1, wherein the block B is a hydrophobic block, comprising hydrophobic units $B_{phobic}$ deriving from monomers selected from among the following monomers:
styrene, α-methylstyrene, vinyltoluene;
vinyl chloride, vinylidene chloride;
methyl, ethyl, butyl, 2-ethylhexyl acrylates and methacrylates; and
vinyl or allyl acetate.

21. The star copolymer as defined by claim 1, wherein the block B is a hydrophilic cationic or potentially cationic block, comprising cationic or potentially cationic units $B_C$ deriving from monomers selected from among the following monomers;
N,N-dimethylaminomethyl acrylamide or methacrylamide;
2-(N,N-dimethylamino)ethyl acrylamide or methacrylamide;
3-(N,N-dimethylamino)propyl acrylamide or methacrylamide;
4-(N,N-dimethylamino)butyl acrylamide or methacrylamide;
2-(dimethylamino)ethyl acrylate (ADAM);
2-(dimethylamino)ethyl methacrylate (DMAM);
3-(dimethylamino)propyl methacrylate, 2-(tert-butylamino)ethyl methacrylate;
2-(dipentylamino)ethyl methacrylate;
2-(diethylamino)ethyl methacrylate;
vinyl pyridines;
vinyl amine;
vinyl imidazolines;
trimethylammonium propylmethacrylate chloride;
trimethylammonium ethylacrylamide chloride or bromide or trimethylammonium methacrylamide chloride or bromide;
trimethylammonium butacrylamide methyl sulfate or trimethylammonium methacrylamide methyl sulfate;
trimethylammonium propylmethacrylamide methyl sulfate (MES);
(3-methacrylamidopropyl)trimethylammonium chloride (MAPTAC);
(3-acrylamidopropyl)trimethylammonium chloride (APTAC);
(methacryloyloxyethyl)trimethylammonium chloride or methyl sulfate;
(acryloyloxyethyl)trimethylammonium chloride or (acryloyloxyethyl)trimethylammonium methyl sulfate (ADAMQUAT C1 or ADAMQUAT MeS);
1-ethyl-2-vinylpyridinium bromide, chloride or methyl sulfate, 1-ethyl-4-vinylpyridinium bromide, chloride or methyl sulfate;
N,N-dimethyldiallylammonium chloride (DADMAC); and
dimethylaminopropylmethacrylamide N-(3-chloro-2-hydroxypropyl)trimethylammonium chloride (DIQUAT).

22. The star copolymer as defined by claim 1, comprising:
a block A deriving from acrylic acid and a block B deriving from butyl acrylate;
a block A deriving from acrylamide and a block B deriving from butyl acrylate; or
a block A deriving from acrylamide and a block B deriving from acryloyloxyethyl trimethylammonium chloride or acryloyloxyethyl trimethylammonium methyl sulfate.

23. The star copolymer as defined by claim 1, wherein the core is obtained according to a method of the "arm first" type or "core first" type.

24. The star copolymer as defined by claim 1, prepared via controlled radical polymerization.

* * * * *